Figure 1:
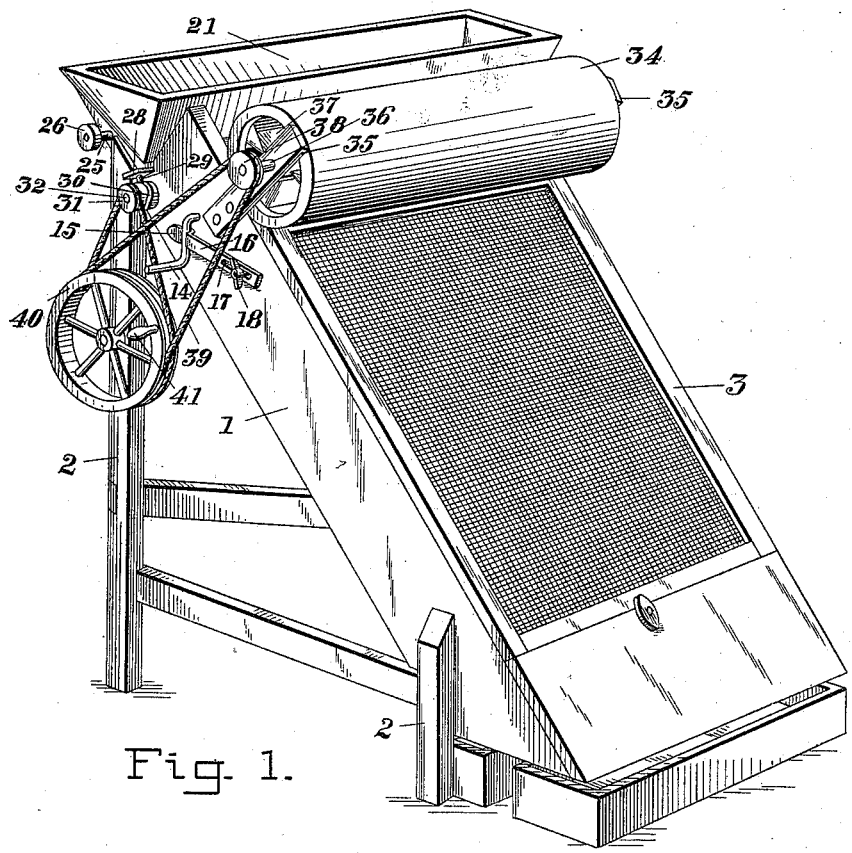

(No Model.)  2 Sheets—Sheet 1.

L. T. HAMMOND.
BERRY SEPARATOR AND CLEANER.

No. 600,784.  Patented Mar. 15, 1898.

Witnesses
Chas. P. Heinemann
Victor J. Evans

Inventor
Lorenzo. T. Hammond.

By John Wedderburn. Attorney

THE NORRIS PETERS CO., PHOTO-LITHO., WASHINGTON, D. C.

(No Model.) 2 Sheets—Sheet 2.

L. T. HAMMOND.
BERRY SEPARATOR AND CLEANER.

No. 600,784. Patented Mar. 15, 1898.

Witnesses
Chas. P. Hunemann
Victor J. Evans

Inventor
Lorenzo T. Hammond
By John Wedderburn.
Attorney

United States Patent Office.

LORENZO T. HAMMOND, OF MASHPEE, MASSACHUSETTS, ASSIGNOR TO JOSEPH A. PETERS, OF SAME PLACE.

BERRY SEPARATOR AND CLEANER.

SPECIFICATION forming part of Letters Patent No. 600,784, dated March 15, 1898.

Application filed May 15, 1897. Serial No. 636,740. (No model.)

*To all whom it may concern:*

Be it known that I, LORENZO T. HAMMOND, of Mashpee, in the county of Barnstable and State of Massachusetts, have invented certain new and useful Improvements in Berry Separators and Cleaners; and I do hereby declare the following to be a full, clear, and exact description of the invention, such as will enable others skilled in the art to which it appertains to make and use the same.

This invention relates to berry separators and cleaners; and the object in view is to provide an efficient machine which is adapted to effect a separation of the defective berries from the good and to discharge the perfect berries into one receptacle and the imperfect berries into a separate and independent receptacle.

The invention also aims to effect a thorough separation from the berries of all refuse matter—such as vines, leaves, chaff, dirt, and dried fruit-worm berries—such being accomplished with the aid of a blower or fan of particular construction in connection with air-current deflectors.

The detailed objects and advantages of the invention will be fully explained in the course of the subjoined description.

The invention consists in a berry separator, screen, and cleaner embodying certain novel features and details of construction and arrangement of parts, as hereinafter fully described, illustrated in the drawings, and incorporated in the claims hereto appended.

Figure 7:
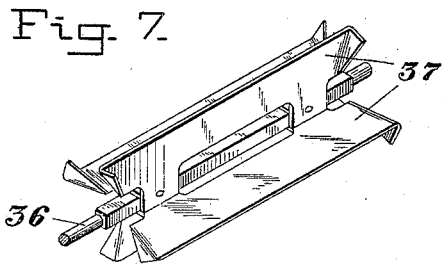
Figure 2:
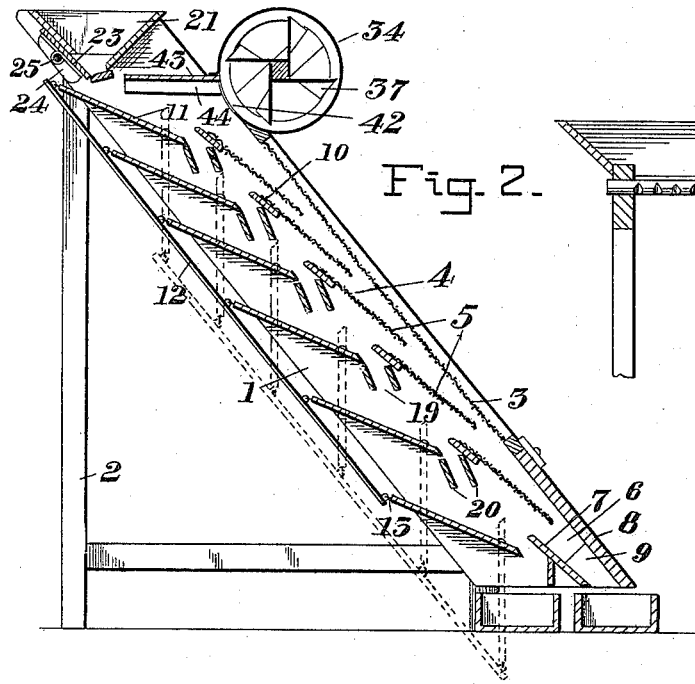
Figure 5:
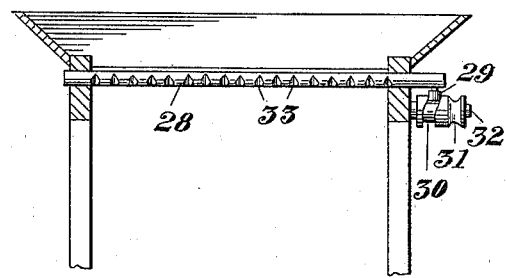
Figure 3:
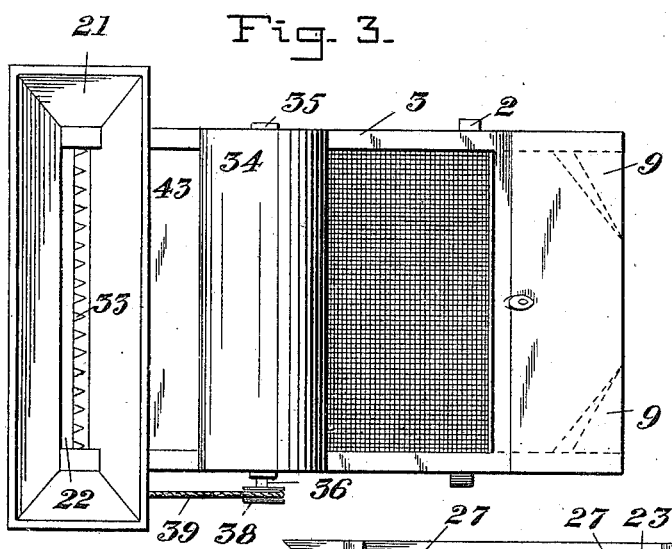
Figure 6:
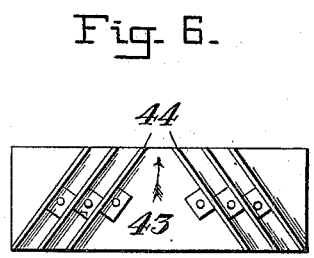
Figure 4:
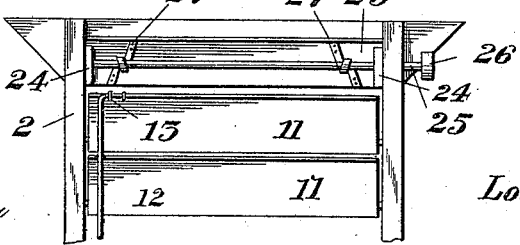

In the accompanying drawings, Figure 1 is a perspective view of a berry-separator constructed in accordance with the present invention. Fig. 2 is a vertical longitudinal section through the same. Fig. 3 is a plan view thereof. Fig. 4 is a detail rear elevation showing the means for adjusting the cut-off gate of the hopper. Fig. 5 is a detail sectional view showing the reciprocating shaker or agitator in the base of the hopper and the actuating-cam therefor. Fig. 6 is a bottom plan view of the air-deflecting board. Fig. 7 is a detail perspective view of the revolving fan or blower.

Similar numerals of reference designate corresponding parts in the several figures of the drawings.

Referring to the drawings, 1 designates a substantially rectangular frame which is supported at any desired inclination upon suitable standards 2, connected and braced by suitable interposed bars forming the supporting-framework of the machine. Attached to the frame 1 is an outer screen 3, which is preferably made removable for giving access to the inner screen. Inside of the screen 3 and removed a sufficient distance therefrom to permit of the gravitation of the berries is a second or inner screen 4, which is composed of a plurality of sections 5, the said sections being inclined and having their adjacent ends overlapped, so as to admit of the escape of the berries from between adjacent sections. The lower edge of one screen-section 5 overlaps or extends over and outside of the upper edge of the next adjacent section below, so that as the berries pass onto one section they will pass beneath the section next above and escape below the lower edge of said upper section and then gravitate to the bottom of the frame 1, whence they will pass through a discharge-opening 6, comprised between downwardly-converging boards 7 and 8. Between the boards 7 and 8 are arranged downwardly-converging filling-strips 9, forming lateral deflectors for directing the berries to a central point, thus reducing the size of the discharge-opening. The several screen-sections are supported at their ends upon the inner walls of the side boards of the inclined frame 1, and each section is secured at its upper edge to a catcher 10 in the form of a wooden bar or slat extending across between the sides of the frame 1 and connected permanently thereto.

Just in rear of each catcher 10 is arranged a shelf 11, the same being pivoted near its front edge between the sides of the frame 1. The rear edges of the several shelves 11 are all connected to a common operating rod or link 12, which is formed to engage staples or eyes 13 at the rear edges of the several shelves, so that when one shelf is rocked all of the shelves will be simultaneously and correspondingly moved. One of the shelves 11 has rigidly connected thereto a crank 14, which is arranged outside of the inclined frame 1, where it may be turned for varying the angles of the shelves, said crank being engaged by the offset extremity 15 of a spring 16, said spring being made adjustable by providing the same with a longitudinal slot 17, through which passes a screw or other form of clamp 18, whereby the spring, when adjusted, may be held fixed relatively to the frame 1. The spring by reason of its engagement with the crank serves to sustain the shelves in their proper adjusted positions.

Between the front edge of each shelf 11 and the rear edge of each catcher or slat 10 is a chute 19, composed of substantially parallel boards 20, spaced a sufficient distance apart to enable the berries to pass between the same and to fall upon the succeeding shelf. The shelves 11 are normally inclined or sloped downwardly toward their front edges, so that as the berries fall thereon they will bounce over the catchers 10 and pass in front of the screen, whereas the imperfect or rotten berries which will not bounce will roll from the shelves and gravitate through the chutes 19 upon the lower shelves successively until they are discharged off the front end of the lower shelf, where they pass into a box or receptacle placed in proper position beneath said lower shelf to catch them.

At the upper end of the separator-frame 1 is a hopper 21, comprising four downwardly-converging walls, the bottom of the hopper being cut away to form a longitudinal discharge-opening 22. Arranged upon the outer side of one of the walls of the hopper, preferably the rear wall, is a sliding gate or cut-off 23, which extends nearly the entire length of the hopper and the lower edge of which is adapted to be projected across the discharge-opening of the hopper. This gate is interposed between the wall of the hopper and cleats or rests 24, secured to the sides of the separator-frame. Arranged outside of the gate 23 is a longitudinal shaft 25, mounted in suitable bearings in the separator-frame and provided at one extremity outside of the frame with a wheel or thumb-piece 26 of any suitable description, by means of which the shaft may be turned. Connected to the outer side of the gate 23 and at spaced points thereon are flexible straps 27, each strap being secured at its opposite ends fixedly to the gate and passing at an intermediate point around the shaft 25, said straps being set oblique in order to admit of the same passing smoothly around the shaft without binding. Thus by turning the shaft 25 the straps 27 operate to reciprocate the gate transversely for effecting a partial or total opening or closing of the discharge-opening in the hopper.

Arranged under the discharge-opening of the hopper is a longitudinally-reciprocating shaker or agitator 28, which slides through openings in the sides of the separator-frame 1. At one end the agitator is provided with a laterally-projecting pin or stud 29, which enters a cam-groove 30, formed in a pulley 31, journaled either on a stud-shaft or a bracket 32, secured to the outside of the separator-frame and adapted to be actuated by the driving-belt of the machine. When said pulley is rotated, it will effect a quick reciprocation of the agitator or shaker by reason of the engagement of the pin 29 with the groove 30. The agitator or shaker is provided in its upper surface with a multiplicity of transverse notches 33, which are intended to obtain a frictional hold upon the berries and thoroughly agitate the same, thus causing the chaff, stems, and other refuse matter to first gravitate through the bottom of the hopper, where they will be subjected to the action of an air-blast and carried away from the rear of the machine.

Arranged near the upper end of the separator and in front thereof is a cylindrical fan-case 34, having open ends. This fan-casing is supported by oblique bars 35, extending diametrically across the ends of the casing and projecting so as to enable them to be secured to the sides of the separator-frame, as shown. Journaled in the oblique bars 35 is the fan-shaft 36, which carries within the casing a series of blades 37, the same being preferably constructed of sheet metal and having their outer ends deflected or bent substantially at right angles, so that they will prevent the air from passing over the ends of the blades under the rapid rotation of the fan. The fan-shaft is journaled in bearings in the oblique bars 35 and extends outside of one of said bars, where it is provided with a pulley 38, around which passes the driving-belt 39, said belt also extending around a pulley 40, to which is attached a hand-crank 41, whereby motion is imparted to the machine. The fan-casing 34 is provided at its inner side with an orifice 42, opening out just above the upper catcher 10 and beneath the deflecting-board 43, interposed between the fan-casing and hopper and above the upper catcher 10. Secured to the under side of the deflecting-board 43 are two sets of deflectors 44, the set at one side of the center of the board 43 being disposed at a reverse angle to those at the other side of the center, so that as the air-blast strikes against said deflectors the current will be directed toward the center of the machine and will also be broken up, thus forming counteracting currents which will insure a portion of the current reaching every point beneath the discharge-opening of the hopper, so as to engage and carry off all refuse matter, thus allowing only clean berries to fall upon the upper shelf 11.

The operation of the machine is as follows: A quantity of berries, good and bad, is placed in the hopper 21 and the berries are agitated by the reciprocation of the shaker 28. The gate 23 is adjusted so as to allow of the discharge of the berries upon the upper shelf 11 in the proper quantity, and by reason of the inclination of the upper shelf the berries will roll to the front edge thereof and pass therefrom through the upper chute 19. In view of the fact that this chute is substantially vertical the berries will drop with considerable force upon the next succeeding shelf and the good berries will bounce therefrom and by reason of the inclination of the shelf pass over the catcher 10 and between the screen-sections and find their way through the discharge-opening at the lower end of the separator into the proper receptacle. The defective or rotten berries will fail to bounce and will simply roll off the forward edges of the several shelves, passing successively through the several chutes and finally rolling off the lower shelf into the receptacle for defective berries. Thus by means of a machine of very simple and inexpensive construction a separation is effected between the perfect and imperfect berries, the said berries being discharged into separate and independent receptacles. The fan and the agitator are both operated at suitable speed from a common source, and this source may consist either of the wheel 40, above described in connection with a hand-crank, or power may be utilized for driving the machine, said power being derived from any suitable motor and applied to the wheel 40 by means of a suitable band in a manner readily understood. One of the most important features of this invention resides in the fact that each succeeding shelf is located at a greater distance from the shelf next above than the previous shelf. In other words, the distances between the several shelves progressively increase toward the lower end of the separator-frame, the effect being to increase the fall of the berries at each successive step and to subject the same to a greater bouncing action.

It will of course be understood that the machine as an entirety is susceptible of various changes in the form, proportion, and minor details of construction which may accordingly be resorted to without departing from the principle or sacrificing any of the advantages of the invention.

Having thus described the invention, what is claimed as new, and desired to be secured by Letters Patent, is—

1. In a berry-separator, an inclined series of shelves arranged at unequal distances apart, the distances between the shelves progressively increasing toward the discharge end of the separator, substantially as described.

2. In a berry-separator, an inclined series of shelves, each independently pivoted on a longitudinal axis and adapted to swing into a substantially vertical position, and means for moving said shelves from their operative positions into pendent or substantially vertical positions, substantially as described.

3. In a berry-separator, an inclined series of shelves, each independently pivoted to turn on a longitudinal axis and adapted to be swung into a substantially vertical position, and a common operating device connected to each and all of said shelves for simultaneously and equally tilting or varying the angles thereof, substantially as described.

4. In a berry-separator, the combination with an inclined series of shelves having their discharge edges arranged successively in advance of each other, of a meshed wire screen comprising a plurality of sections overlapping each other and having their upper edges located in advance of and adjacent to the discharge edges of the several shelves, substantially as described.

5. In a berry-separator, the combination with an inclined series of shelves and means for simultaneously adjusting the angles thereof, of a meshed wire screen comprising a plurality of inclined sections having their adjacent edges overlapped and spaced apart, and a series of catches extending in planes parallel to the screen-sections and having the upper edges of said sections attached thereto, said catches extending slightly above and being removed from the discharge edges of the shelves, substantially as described.

6. In a berry-separator, the combination with an inclined series of shelves, of a meshed wire screen arranged at the front of the separator, an inner meshed wire screen interposed between the aforesaid screen and said shelves and located at a distance from the front screen, said inner screen being made up of a plurality of sections having their adjacent ends overlapped and separated with the upper edges thereof arranged adjacent to the discharge edges of the shelves, substantially as described.

7. In a berry-separator, the combination with a hopper, and a series of shelves arranged beneath the same, of a fan-casing, a revolving fan or blower therein, and a deflecting-board arranged below the plane of the hopper and in the path of the blast, and provided on its under side with two converging groups of parallel deflecting-strips for centralizing and distributing the air-blast, substantially as and for the purpose specified.

8. In a berry-separator, the combination with a hopper, and a series of shelves arranged below the discharge end thereof, of a fan-casing, a rotary fan arranged therein and having a series of blades the ends of which are deflected to form air-gatherers, and a deflecting-board arranged in the path of the blast and provided on its under side with converging groups of parallel deflecting-strips, all arranged for joint operation, substantially as described.

In testimony whereof I have signed this specification in the presence of two subscribing witnesses.

LORENZO T. HAMMOND.

Witnesses:
O. M. HOLMES,
CHAS. F. MORSE.